(12) United States Patent
Nakatogawa et al.

(10) Patent No.: US 12,567,163 B2
(45) Date of Patent: Mar. 3, 2026

(54) IMAGING SYSTEM AND OBJECT DEPTH ESTIMATION METHOD

(71) Applicant: Japan Display Inc., Tokyo (JP)

(72) Inventors: Hirondo Nakatogawa, Tokyo (JP); Yoshiro Aoki, Tokyo (JP); Hitoshi Tanaka, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/884,138

(22) Filed: Sep. 13, 2024

(65) Prior Publication Data

US 2025/0095179 A1 Mar. 20, 2025

(51) Int. Cl.
G06T 7/571 (2017.01)
H04N 17/00 (2006.01)
H04N 23/95 (2023.01)

(52) U.S. Cl.
CPC ........... G06T 7/571 (2017.01); H04N 17/002 (2013.01); H04N 23/95 (2023.01); *G06T 2207/30252* (2013.01)

(58) Field of Classification Search
CPC .......... G06T 2207/30252; G06T 7/571; H04N 17/002; H04N 23/95
USPC ........................................................ 348/135
See application file for complete search history.

(56) References Cited

U.S. PATENT DOCUMENTS

| | | | | |
|---|---|---|---|---|
| 8,773,570 B2 * | 7/2014 | Kimura | | G01C 3/32 |
| | | | | 348/340 |
| 10,075,633 B2 * | 9/2018 | Kim | | H04N 23/815 |
| 2012/0200673 A1 * | 8/2012 | Tagawa | | G02B 7/365 |
| | | | | 348/46 |
| 2013/0308005 A1 * | 11/2013 | Takahashi | | H04N 23/676 |
| | | | | 348/222.1 |
| 2017/0163876 A1 * | 6/2017 | Takahashi | | G06T 5/73 |
| 2020/0193570 A1 * | 6/2020 | Aoki | | G06T 5/50 |
| 2022/0092814 A1 * | 3/2022 | Eberspach | | G06T 7/74 |

OTHER PUBLICATIONS

Zhou et al., "Coded Aperture Pairs for Depth from Defocus and Defocus Deblurring", International Journal of Computer Vision, vol. 93, No. 1, May 2011, pp. 1-17.

* cited by examiner

*Primary Examiner* — Christopher S Kelley
*Assistant Examiner* — Ana Picon-Feliciano
(74) *Attorney, Agent, or Firm* — XSENSUS LLP

(57) ABSTRACT

Object depth estimation based on coded imaging is improved in terms of practicality. An imaging system is provided to include: an imaging apparatus including an optical system and an imaging apparatus and configured to perform coded imaging on an object under use of the optical system and the imaging apparatus; a temperature specifying section configured to specify an environmental temperature of the imaging apparatus; a function specifying section configured to specify a point spread function used for decoding a captured image on the basis of the specified environmental temperature; and a depth estimating section configured to estimate a depth of the object at each position from the optical system by decoding the captured image of the imaging apparatus under use of the specified point spread function.

10 Claims, 9 Drawing Sheets

START

GENERATE POINT SPREAD FUNCTION (PSF) — J1

CODED IMAGING — J2

DECODE CAPTURED IMAGE
(GENERATE DECODED IMAGE + ESTIMATE DEPTH) — J3

SPECIFY ENVIRONMENTAL TEMPERATURE — J4

CORRECT DEPTH ESTIMATE VALUE — J5

GENERATE DEPTH MAP — J6

END

| | | POINT SPREAD FUNCTION F APPLIED |
|---|---|---|
| ENVIRONMENTAL TEMPERATURE T | T0 | F(T0) |
| | T1 | F(T1) |
| | T2 | F(T2) |
| | ⋮ | ⋮ |
| | Tn | F(Tn) |
| | ⋮ | ⋮ |
| | TM | F(TM) |

IMAGING SYSTEM AND OBJECT DEPTH ESTIMATION METHOD

CROSS-REFERENCE TO RELATED APPLICATION

The present application claims priority from Japanese Patent Application No. 2023-152118 filed on Sep. 20, 2023, the content of which is hereby incorporated by reference into this application.

TECHNICAL FIELD OF THE INVENTION

The present invention relates to an imaging system and an object depth estimation method.

BACKGROUND OF THE INVENTION

In the field of coded imaging, a technique called DFD (Depth From Defocus) is known. The DFD technique is a technique of estimating the distance from the optical system of the imaging apparatus to the object, i.e., the depth or perspective of the object, based on the degree of edge blurring that appears in the image obtained by imaging. The DFD technique is described in, for example, "[Coded Aperture Pairs for Depth from Defocus and Defocus Deblurring], C. Zhou, S. Lin and S. K. Nayar, International Journal of Computer Vision, Vol. 93, No. 1, pp. 53, May. 2011 (Non-Patent Document 1)". In the DFD technique, coded imaging is performed in which a mask that is called coded aperture is arranged in a light entrance region of the optical system and an image of the object is captured. Next, the captured image obtained by the coded imaging is decoded based on a point spread function specific to the mask, and the depth of the object is estimated. Note that the point spread function is generally called PSF (Point Spread Function) and is also called the blur function, blur spread function, point image distribution function, etc.

SUMMARY OF THE INVENTION

The DFD technique is still under development, and still has much room to be improved in terms of practicality. Due to the above circumstances, there is a demand for more practical DFD technique.

The outline of the typical aspects of the inventions disclosed in the present application will be briefly described as follows.

According to one typical embodiment of the present invention, an imaging system includes: an imaging apparatus including an optical system and an imaging element and configured to perform coded imaging on an object under use of the optical system and the imaging element; a temperature specifying section configured to specify an environmental temperature of the imaging apparatus; a function specifying section configured to specify a point spread function used for decoding a captured image on the basis of the specified environmental temperature; and a depth estimating section configured to estimate a depth of the object at each position from the optical system by decoding the captured image of the imaging apparatus under use of the specified point spread function.

According to another typical embodiment of the present invention, an object depth estimation method includes: a step of performing coded imaging on an object under use of an imaging apparatus including an optical system and an imaging element; a step of specifying an environmental temperature of the imaging apparatus; a step of specifying a point spread function used for decoding a captured image on the basis of the specified environmental temperature; and a step of estimate a depth of the object at each position from the optical system by decoding the captured image of the imaging apparatus under use of the specified point spread function.

BRIEF DESCRIPTIONS OF THE DRAWINGS

FIG. 8 is a diagram illustrating a table showing correspondences between an environmental temperature and a point spread function applied at the environmental temperature.

DESCRIPTIONS OF THE PREFERRED EMBODIMENTS

Details of Problems

The basic contents of the DFD technique and the problems found by the present inventors will be described prior to explanation for embodiments of the present invention.

A degree of the blur of the object in the captured image generally depends on a point spread function defined by the optical system of the imaging apparatus, a shape of the light entrance region of the optical system, and the like. When a mask configured to partially shield light is arranged in the light entrance region of the optical system, the point spread function is defined for each mask. The image capturing on the object under use of the mask-arranged imaging apparatus is referred to as coded imaging. When the coded imaging is performed on the object, an image that blurs based on the point spread function specific to the used mask is acquired as the captured image.

By decoding the blurred image as the captured image to perform deconvolution based on the point spread function specific to the used mask, a decoded image with the improved blur and object depth information corresponding to each position of the object included in the decoded image are acquired.

To the contrary, the present inventors have found the following problems to be explained, provided in the case of the estimation of the depth of the object at each position by decoding the captured image acquired by the coded imaging on the object under use of the imaging apparatus as described above.

Figure 9:
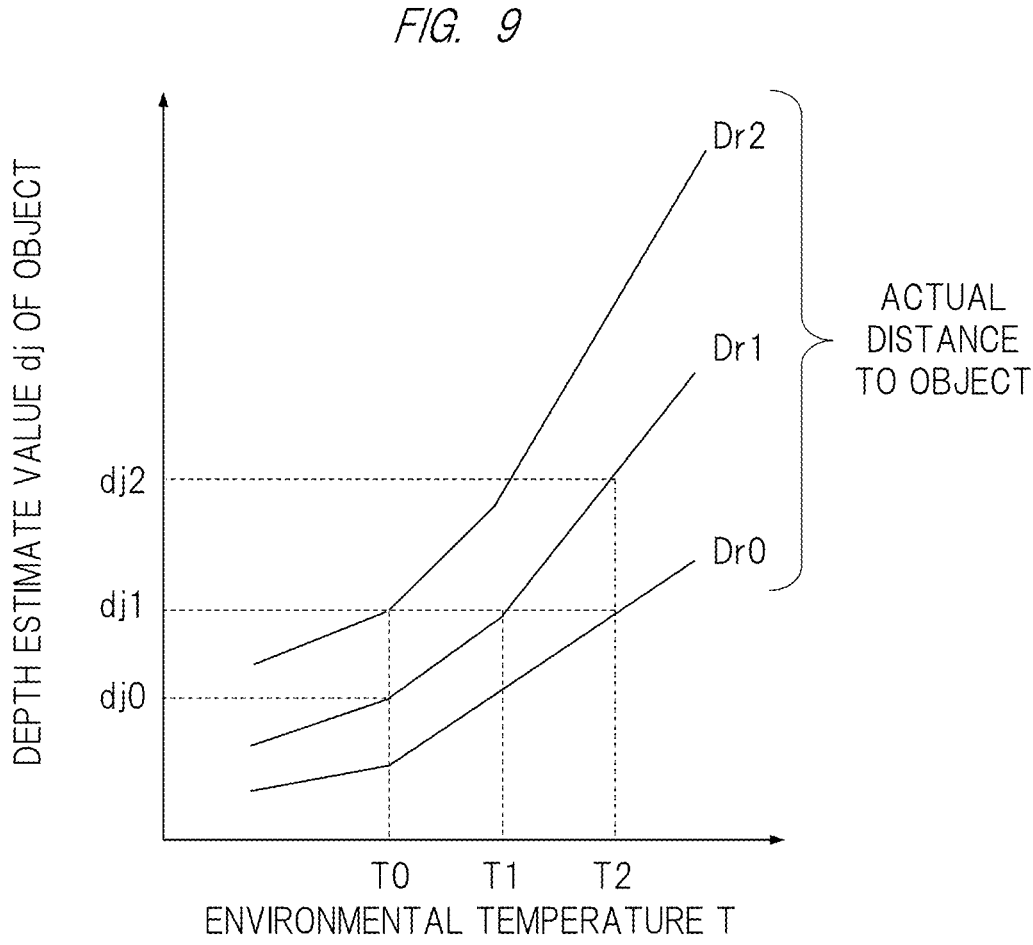
FIG. 9 is a diagram illustrating an exemplary relationship between an object depth estimate value and the environmental temperature.

FIG. 9 is a diagram illustrating exemplary relationship between an object depth estimate value and an environmental temperature. As illustrated in FIG. 9, from research and development of the DFD technique, the present inventors have found that the object depth estimate value "dj" changes depending on an environmental temperature "T" of the imaging apparatus. For example, as illustrated in FIG. 9, when an actual distance of the object from the optical system is "Dr1", if the environmental temperature "T" is T0, the object depth estimate value dj is acquired as dj0. To the contrary, if the environmental temperature T changes to T1, the object depth estimate value dj changes to dj1. If the environmental temperature T changes to T2, the object depth estimate value dj changes to dj2.

The phenomenon that is the change in the object depth estimate value depending on the environmental temperature as described above may be caused because a change of a positional relationship between the optical system and the imaging apparatus of the imaging apparatus changed by the environmental temperature T is reflected on the captured image. Such a change in the positional relationship between the optical system and the imaging apparatus may be mainly regarded as a change in the distance between the optical system and the imaging apparatus.

Figure 10:
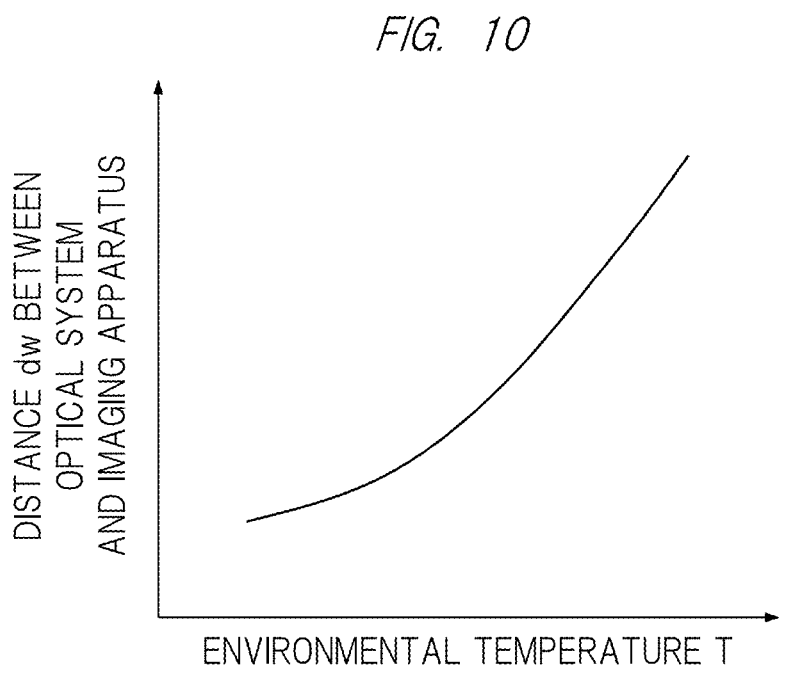
FIG. 10 is a diagram illustrating an exemplary relationship between the environmental temperature and a distance between the optical system and the imaging apparatus.

FIG. 10 is a diagram illustrating an exemplary relationship between the environmental temperature T and the distance "dw" between the optical system and the imaging apparatus. As illustrated in FIG. 10, for example, the higher the environmental temperature T is, the larger the distance between the optical system and the imaging apparatus may be. Such a change in the distance between the optical system and the imaging apparatus depending on the environmental temperature may be caused based on, for example, deformation of a member supporting at least one of the optical system and the imaging apparatus due to temperature, and temperature property of the apparatus configured to control the positional relationship between the optical system and the imaging apparatus.

Figure 11:
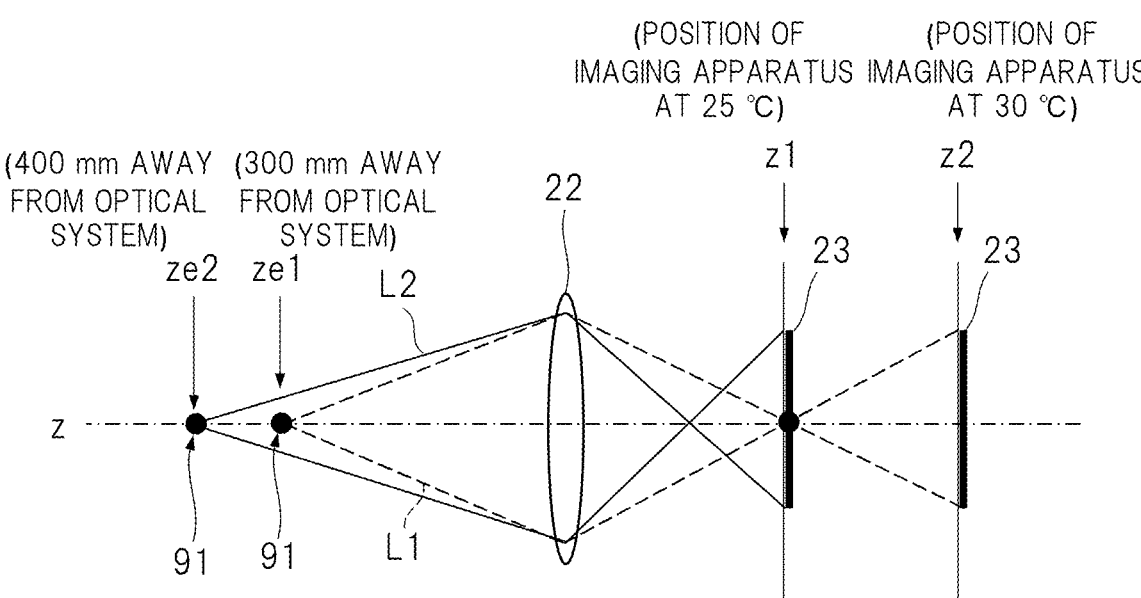
FIG. 11 is a diagram for explaining a state of a change in the imaging system due to a change in the environmental temperature, which results in a change in the object depth estimate value.

FIG. 11 is a diagram for explaining a state of the change in the imaging system due to the change in the environmental temperature, which results in the change in the object depth estimate value.

As illustrated in FIG. 11, for example, when the environmental temperature is 25° C. while a focal position is 300 mm away from the optical system 22, light "L1" of a point light source 91 at a position "ze1" that is 300 mm away from the optical system 22 forms an image on a light receiving surface of an imaging element 23 at a position "z1" at the environmental temperature of 25° C. This state is assumed as a first state.

Light L2 of the point light source 91 at a position "ze2" that is 400 mm away from the optical system 22 forms an image in front of the imaging element 23, and the image is blurred to spread over the entire light receiving surface of the imaging element 23 at the position z1. This state is assumed as a second state.

To the contrary, when the environmental temperature changes to 30° C. while the imaging element 23 moves to a position z2 as a relative value away from the optical system 22, the light L1 of the point light source 91 at the position ze1 forms a blurred image spreading over the entire light receiving surface of the imaging element 23 at the position z2 at the environmental temperature of 30° C. This state is assumed as a third state.

In viewpoint of the imaging element 23, the third state at the environmental temperature of 30° C. is regarded to be almost the same as the second state at an environmental temperature of 25° C. Thus, with reference to the environmental temperature of 25° C., the image of the point light source 91 at the position ze1 that is 300 mm away from the optical system 22 is regarded as the image of the point light source 91 at the position ze2 that is 400 mm away from the optical system 22, and the depth estimate value of the point light source 91 is erroneously measured as a distance that is 400 mm away from the optical system 22. That is, when the environmental temperature changes from 25° C. to 30° C., the depth estimate value that is 300 mm away from the optical system 22 deviates to the depth estimate value that is 400 mm away from the optical system 22.

Under the above circumstances, there is the demand in the DFD technique for a technique capable of accurately estimating the object depth irrespective of the environmental temperature of the imaging apparatus.

As a result of vigorous studies in consideration of the above circumstances, the present inventors have devised the present invention. Embodiments of the present invention will be described below. Note that the following embodiments are examples for achieving the present invention, and do not limit the technical scope of the present invention. In the following embodiments, components having the same function are denoted by the same reference signs throughout the drawings for describing the embodiment, and the repetitive description thereof will be omitted.

First Embodiment

An imaging system according to a first embodiment of the present invention will be described. The imaging system according to the first embodiment of the present invention includes: an imaging apparatus including an optical system and an imaging apparatus and configured to perform coded imaging on an object under use of the optical system and the imaging apparatus; a temperature specifying section configured to specify an environmental temperature of the imaging apparatus; a function specifying section configured to specify a point spread function used for decoding a captured image on the basis of the specified environmental temperature; and a depth estimating section configured to estimate the depth of the object at each position from the optical system by decoding the captured image of the imaging apparatus under use of the specified point spread function. The imaging system will be described below in detail.

Figure 1:
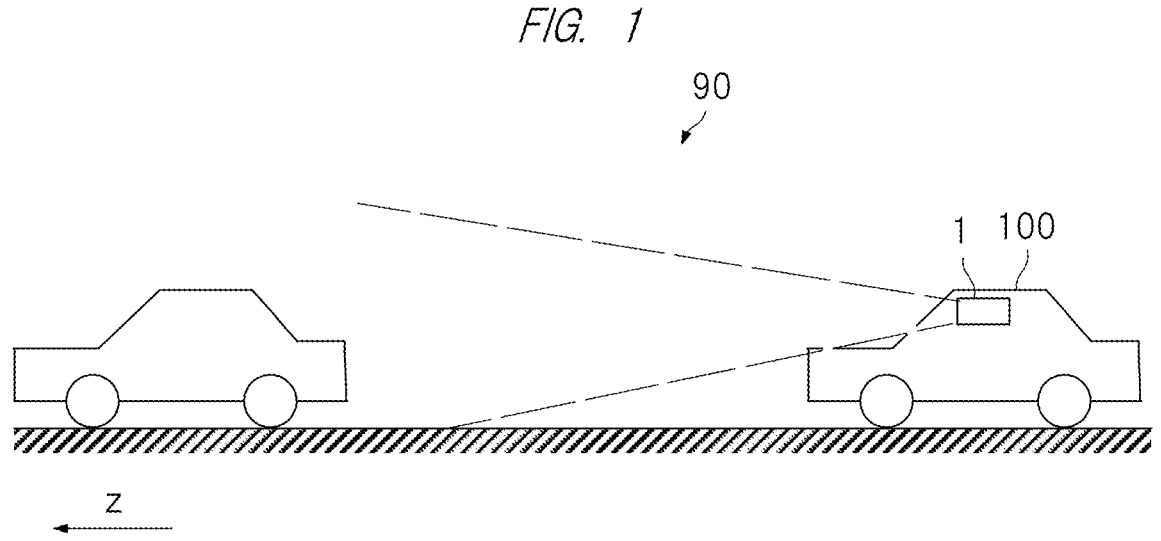
FIG. 1 is a diagram schematically illustrating exemplary arrangement of an imaging system according to a first embodiment.

FIG. 1 is a diagram schematically illustrating exemplary arrangement of the imaging system 1 according to the first embodiment. A "z" direction in the drawing is a forward-moving direction of an automobile 100.

The imaging system 1 is arranged on the automobile 100 as a vehicle as illustrated in FIG. 1. The imaging system 1 is configured to perform coded imaging on an object 90 in a travelling direction of the automobile 100, in other words, ahead of the same.

Exemplary Configuration of Imaging System According to First Embodiment

Figure 2:
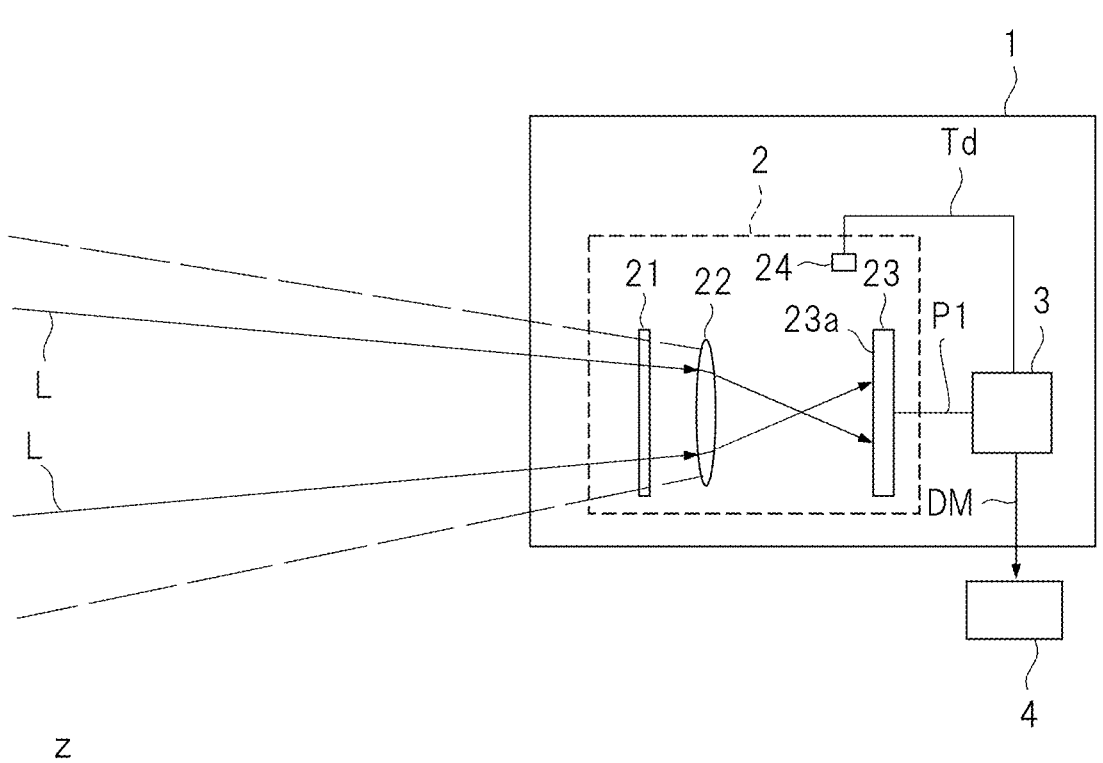
FIG. 2 is a diagram illustrating an exemplary configuration of the imaging system.

FIG. 2 is a diagram illustrating an exemplary configuration of the imaging system 1. The imaging system 1 includes an imaging apparatus 2 and a computing control processor 3 as illustrated in FIG. 2.

The imaging apparatus 2 as a part of the imaging system 1 is arranged on the automobile 100 as the vehicle. The imaging apparatus 2 includes a mask 21, the optical system 22, the imaging element 23, and a temperature sensor 24.

The mask 21 has a specific geometric aperture pattern, and functions as a filter against light which enters the optical system 22 from the object 90 and reaches the imaging element 23. The mask 21 may be arranged between the optical system 22 and the imaging element 23. Alternatively, if the optical system 22 is made of coupling lenses, the mask 21 may be arranged between the lenses. Note that the mask 21 is also referred to as "coded aperture."

The optical system 22 condenses light entering from the object 90 onto a light receiving surface 23a of the imaging element 23 to form the image. The optical system 22 is, for example, a lens. The lens may be a single lens, a compound lens, a unifocal lens, or a zoom lens.

The imaging element 23 has the light receiving surface 23a, and the light receiving surface 23a is made of a plurality of two-dimensionally arranged photoelectric conversion elements. The imaging element 23 converts the light L received on the light receiving surface 23a into an electric signal depending on intensity of the light, and outputs image data based on the electric signal to the computing control processor 3. Note that the imaging element 23 may output the photoelectrically-converted electric signal to the computing control processor 3, and then, the computing control processor 3 may acquire image data based on the electric signal. The imaging element 23 is also referred to as image sensor.

The temperature sensor 24 is arranged near the optical system 22 and the imaging element 23. The temperature sensor 24 is arranged in, for example, a casing including the optical system 22 and the imaging element 23 therein although not illustrated. The temperature sensor 24 outputs a signal Td depending on the environmental temperature of the imaging apparatus 2. The environmental temperature of the imaging apparatus 2 can be specified on the basis of the output signal Td. The temperature sensor 24 is made of, for example, a thermocouple, a resistance temperature detector, a thermistor, or the like.

The imaging apparatus 2 has a point spread function that is specific to the imaging apparatus 2 itself. The point spread function is a function to define how a point image on the object blurs in the captured image, and is defined by a combination of the mask 21, the optical system 22, and the imaging element 23. As described above, note that the point spread function has a factor depending on a positional relationship between the optical system 22 and the imaging element 23. The positional relationship between the optical system 22 and the imaging element 23 may change depending on the environmental temperature. For example, the positional relationship may be changed by deformation of members supporting the optical system 22 and the imaging element 23 due to the change in temperature, temperature property of the apparatus configured to control the positional relationship between the optical system 22 and the imaging element 23, or the like. In the present embodiment, it is assumed that the positional relationship between the optical system 22 and the imaging element 23 is changed by the change in the environmental temperature of the imaging apparatus 2, and thus, the point spread function is also changed.

The computing control processor 3 specifies the environmental temperature of the imaging apparatus 2 on the basis of the output signal of the temperature sensor 24. The computing control processor 3 specifies the point spread function in the coded imaging of the imaging apparatus 2 on the basis of the specified environmental temperature. Under use of the specified point spread function, the computing control processor 3 decodes the captured image P1 acquired by the coded imaging. By performing the decoding, the computing control processor acquires a blur-improved decoded image of the object 90 and a depth estimate value of the object 90 at each position from the optical system. The computing control processor 3 generates a depth map "DM" representing correspondence between the decoded image and the depth estimate value, and outputs the depth map DM to an external apparatus 4 or the like.

The external apparatus 4 performs various processings under use of the depth map DM received from the computing control processor 3. The external apparatus 4 is, for example, an automobile driving assistance system that uses the received depth map DM to control the steering wheel, the accelerator, the brake, and the like and to detect and report dangerous situations.

Figure 3:
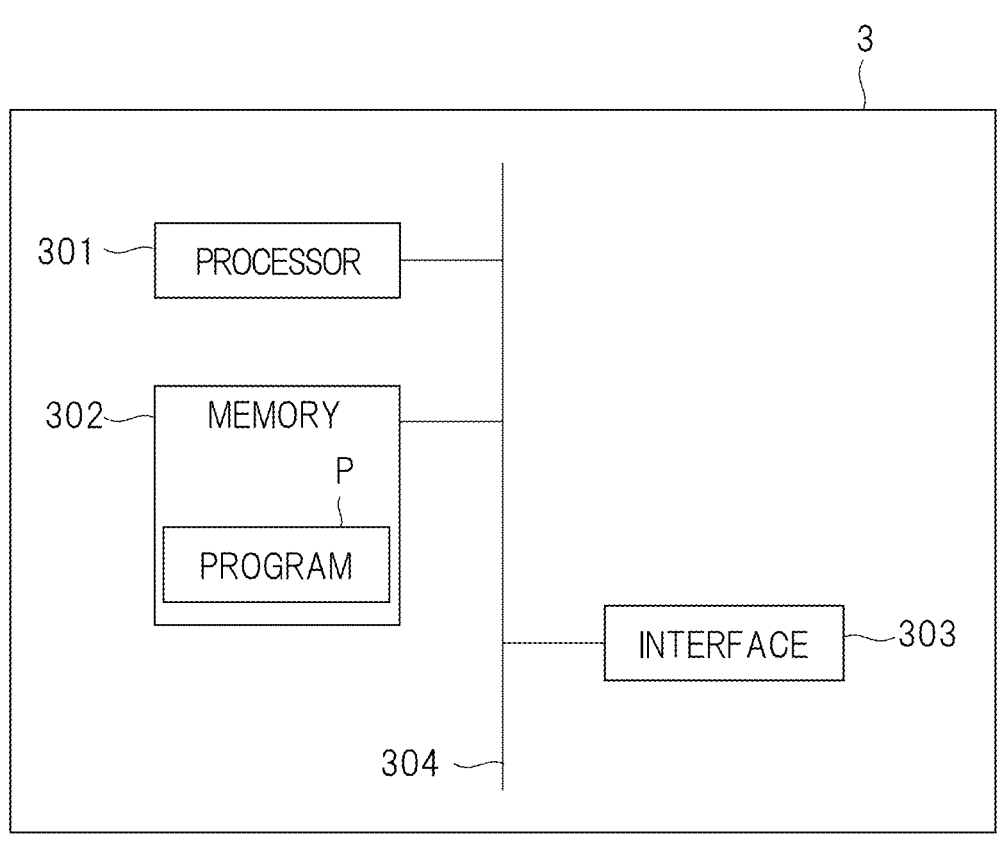
FIG. 3 is a diagram illustrating an exemplary configuration of a computing control processor.

FIG. 3 is a diagram illustrating an exemplary configuration of the computing control processor 3. In the present embodiment, the computing control processor 3 is a computer including a processor 301, a memory 302, an interface 303, and a communication bus 304. The processor 301, the memory 302, and the interface 303 are connected to be mutually communicable via the communication bus 304. Note that at least a part of the computing control processor 3 may be made of a semiconductor device such as Field Programmable Gate Array (FPGA) or Application Specific Integrated Circuit (ASIC).

The processor 301 is, for example, a Central Processing Unit (CPU), a Micro Processing Unit (MPU), a Micro Controller Unit (MCU), a Graphics Processing Unit (GPU), or the like. The processor 301 performs various types of computing and various processings.

The memory 302 is, for example, a semiconductor storage device, a Hard Disk Drive (HDD), a Solid State Drive (SSD), or the like. The memory 302 stores a program "P". When the processor 301 reads and executes the program P stored in the memory 302, the computer functions as various functional blocks.

The interface 303 receives an electric signal or image data indicative of the captured image from the imaging element 23, and outputs the depth information of the object 90 such as the depth map DM to the outside.

Function Blocks of Computing Control Processor

Figure 4:
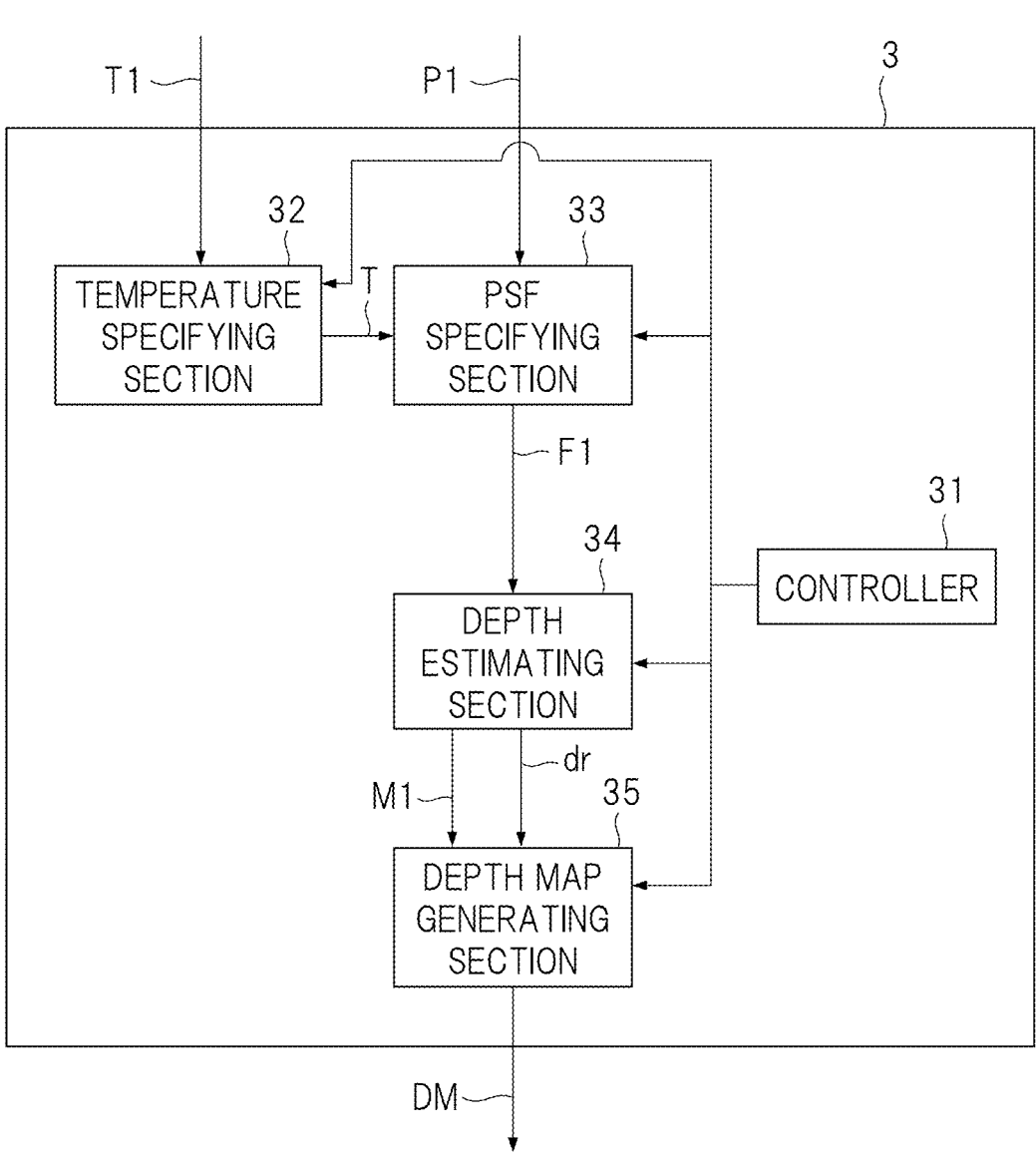
FIG. 4 is a diagram illustrating exemplary functional blocks of the computing control processor.

FIG. 4 is a diagram illustrating exemplary functional blocks of the computing control processor 3. The processor 301 executes the program P as described above to achieve the functional blocks. As illustrated in FIG. 4, the computing control processor 3 includes, as the functional blocks, a controller 31, a temperature specifying section 32, a PSF specifying section 33, a depth estimating section 34, and a depth map generating section 35.

The controller 31 controls the respective sections to receive the captured image P1 acquired by the coded imaging, to acquire the decoded image M1 acquired by decoding the captured image P1 and the object depth estimate value dr, to specify the environmental temperature T, to correct the depth estimate value dj, to generate the depth map DM, and the like.

The temperature specifying section 32 specifies the environmental temperature T as one parameter in the imaging apparatus 2. In the present embodiment, the environmental temperature T is specified on the basis of the output signal of the temperature sensor 24. Note that the temperature specifying section 32 may specify the environmental temperature T on the basis of information other than that of the temperature sensor 24. For example, the temperature specifying section 32 may specify the environmental temperature T on the basis of temperature information received from the external apparatus 4.

The PSF specifying section 33 acquires and specifies the point spread function used for the decoding by performing the computing on the basis of the specified environmental temperature T. For example, the PSF specifying section 33 acquires the distance between the optical system 22 and the imaging element 23 on the basis of the specified environmental temperature T with reference to the relationship between the environmental temperature T and the distance between the optical system 22 and the imaging element 23. The relationship between the environmental temperature T and the distance between the optical system 22 and the imaging element 23 can be previously acquired by experiments. The PSF specifying section 33 acquires and specifies the point spread function "F" by performing predetermined computing or simulation on the basis of the acquired distance between the optical system 22 and the imaging element 23.

A method for acquiring the point spread function F by performing the simulation based on the distance between the optical system 22 and the imaging element 23 is feasible by, for example, a simulation method that is a publicly-known technique. The simulation method employs a method described in, for example, a Non-Patent Document "[Deep Optics for Monocular Depth Estimation and 3D Detection], Julie Chang, Gordon Wetzstein, arXiv: 1904.08601v1 [cs. CV], 18 Apr. 2019". A method for acquiring the PSF is described in, for example, this Non-Patent Document, a section "3. Differentiable Image Formation Model".

If the point spread function F used for the decoding is acquired by the computing as described above, the point spread function depending on the environmental temperature T can be acquired not discretely but continuously, and therefore, the appropriate point spread function F can be accurately acquired. Consequently, the captured image can be appropriately decoded as intended, and therefore, the object depth estimate value can be accurately acquired.

The depth estimating section 34 receives the captured image P1 acquired by the coded imaging from the imaging element 23 in response to control of the controller 31. The depth estimating section 34 decodes the received captured image P1. The decoding processing on the captured image P1 is a deconvolution processing based on the point spread function defined by the aperture pattern of the mask 21, the optical system 22, the imaging element 23, and the like. The point spread function used for the decoding in this case is a point spread function F specified by the PSF specifying section 33. By the decoding processing on the captured image P1, a decoded image M1 that is a blur-improved image of the object 90 and a depth estimate value dr of the object 90 relative to the optical system 22 are acquired. In the present specification, note that the depth estimate value dr indicates a set of the depth estimate values of the object 90 at respective positions.

In response to control of the controller 31, the depth map generating section 35 generates the depth map DM making correspondence between each position of the object 90 included in the decoded image M1 and the corrected depth estimate value dr. The depth map generating section 35 outputs the generated depth map DM to the external apparatus 4 or the like.

Operation Flow in Imaging System According to First Embodiment

An operation flow in the imaging system 1 will be described below.

Figure 5:
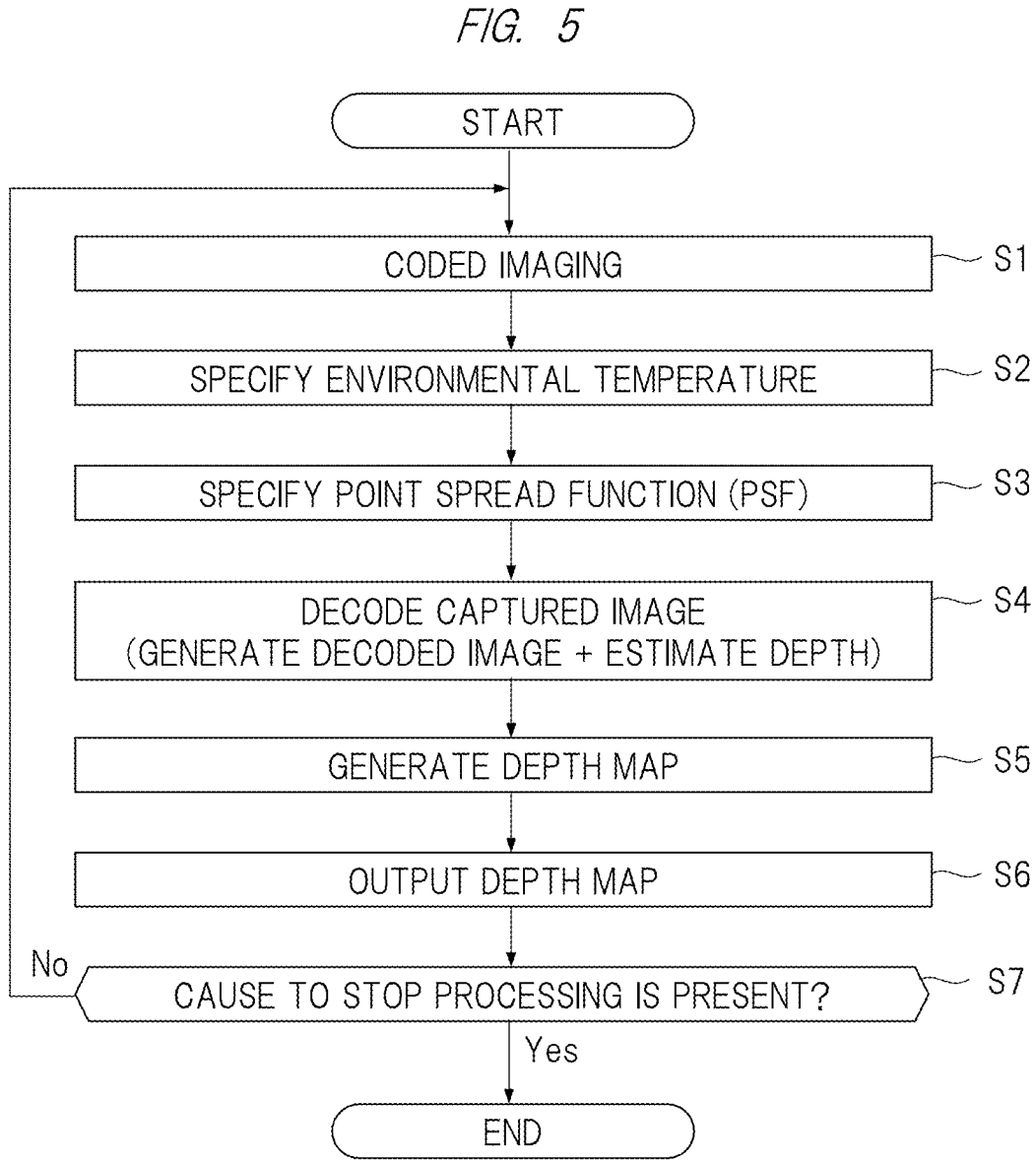
FIG. 5 is a flowchart illustrating an exemplary operation flow of the imaging system according to the first embodiment.

FIG. 5 is a flowchart illustrating an exemplary operation flow in the imaging system 1 according to the first embodiment.

As illustrated in FIG. 5, in step S1, a processing of the coded imaging is performed. Specifically, the depth estimating section 34 performs the coded imaging on the object 90 to acquire the captured image by reading the image data from the imaging element 23 in response to the control of the controller 31.

In step S2, a processing of specifying the environmental temperature is performed. Specifically, the temperature specifying section 32 specifies the environment temperature T of the imaging apparatus 2 on the basis of the output signal of the temperature sensor 24 or the like.

In step S3, a processing of specifying the point spread function is performed. Specifically, on the basis of the specified environmental temperature T, the PSF specifying section 33 specifies the point spread function used for decoding the captured image acquired by the coded imaging. The point spread function F specified in step S3 is a function acquired inconsideration of the change in the positional relationship between the optical system 22 and the imaging element 23 due to the change in the environmental temperature T. When the captured image is decoded under use of the point spread function F, the acquired object depth estimate value is an estimate value from which the error of the estimate value due to the change in the positional relationship is canceled.

In step S4, a processing of decoding the captured image is performed. Specifically, the depth estimating section 34 performs the decoding processing on the captured image P1 on the basis of the specified point spread function in response to control of the controller 31, and acquires the decoded image M1 of the object 90 and the depth estimate value dr of the object 90 at each position. As described above, the acquired depth estimate value dr of the object 90 at each position is the estimate value from which the error of the estimate value due to the change in the positional relationship between the optical system 22 and the imaging element 23 depending on the environmental temperature T is canceled.

In step S5, a processing of generating the depth map based on the acquired depth estimate value is performed. Specifically, the depth map generating section 35 generates the depth map DM by making correspondence between each position of the decoded image M1 acquired by the decoding and the depth estimate value dr of the object 90 at each potion, in response to control of the controller 31.

In step S6, a processing of outputting the depth map is performed. Specifically, the depth map generating section 35 outputs the generated depth map DM to the external apparatus 4 or the like in response to control of the controller 31. The external apparatus 4 is, for example, the driving assistance apparatus for the automobile 100, or the like. The external apparatus 4, when being the driving assistance apparatus, can sense an obstacle ahead of the automobile 100, the distance to the vehicle traveling ahead, or the like, and can use the sensed information for automatic braking, cruise control, or the like of the automobile 100.

In step S7, a processing of determining whether there is a cause to stop the processing is performed. Specifically, the controller 31 determines whether there is a cause to stop the processing. For example, if an instruction to stop the processing is input from a user or the external apparatus 4 or if any error is occurring, it is determined that there is the cause to stop the processing. If the instruction or the error is not present, it is determined that there is no cause to stop the processing. The controller 31 ends the processing if it is determined that there is the cause to stop the processing (S7: Yes), or returns the processing to step S1 and continues the processing if it is determined that there is no cause to stop the processing (S7: No).

Note that the environmental temperature may be specified any time in step S2 before the captured image is decoded, under use of the output signal of the temperature sensor 24 which is acquired nearly at the time of coded imaging. Also, the point spread function may be specified any time in step S3 after the environmental temperature is specified and before the captured image is decoded.

As a result, in the imaging system 1 according to the first embodiment, the coded imaging is performed on the object 90 by the imaging apparatus 2. The imaging system 1 specifies the environmental temperature T of the imaging apparatus 2. The imaging system 1 acquires and specifies the point spread function F used for decoding the captured image P1 by performing the computing on the basis of the specified environmental temperature T. The imaging system 1 acquires the blur-improved decoded image M1 and the depth estimate value dr of the object at each position from the optical system by decoding the captured image P1 acquired by the coded imaging under use of the specified point spread function F.

Method of Correcting Depth Estimate Value According to Comparative Example of First Embodiment Another method of correcting the error of the object depth estimate value due to the change in the environmental temperature will be describe below as a comparative example of the first embodiment. Note that this method is one of methods designed by the present inventors, and is not a prior art of the present invention.

Figure 6:
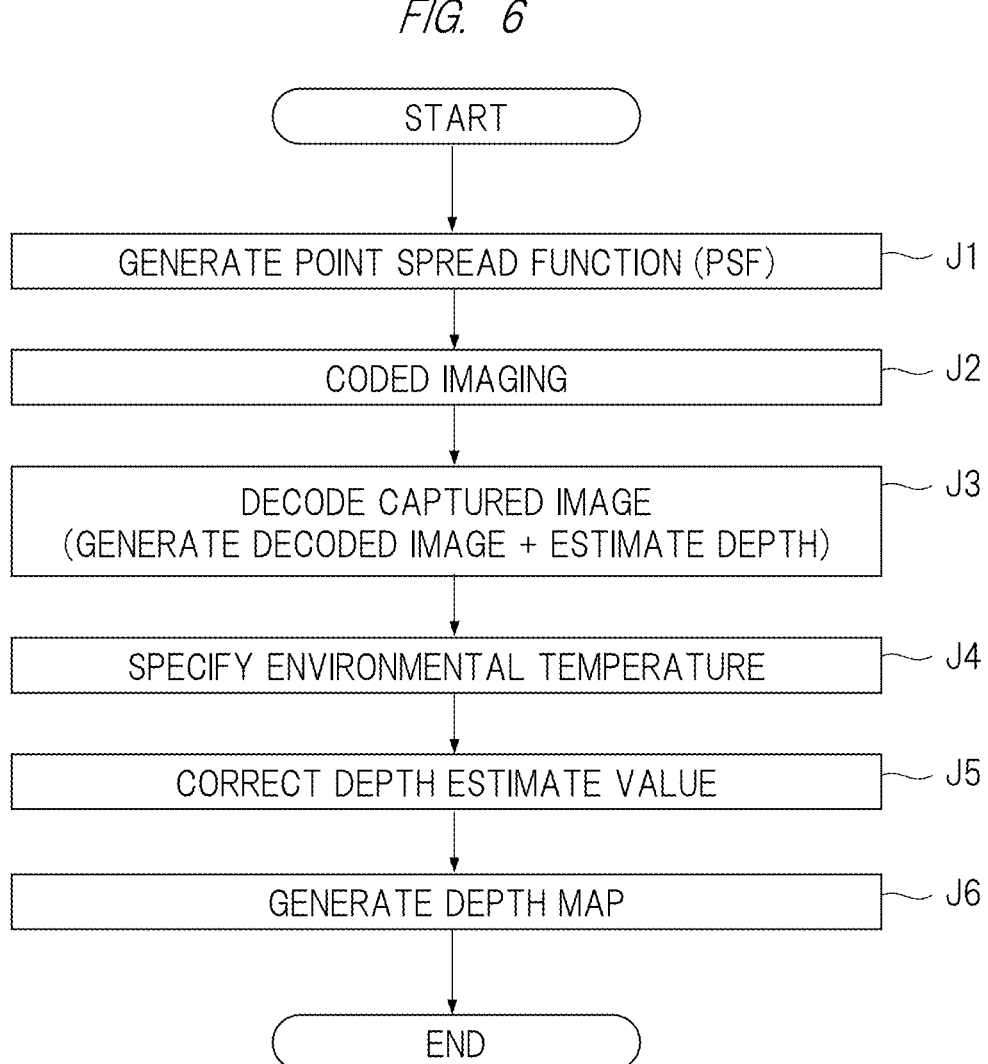
FIG. 6 is a process flowchart of another method for correcting an error of an object depth estimate value depending on a change in an environmental temperature.

FIG. 6 is a process flowchart illustrating another method of correcting the error of the object depth estimate value depending on the change in the environmental temperature.

As illustrated in FIG. 6, for example, in step J1, the point spread function is previously generated on the basis of the imaging system of the imaging apparatus configured to perform the coded imaging.

In step J2, the coded imaging is performed on the object by the imaging apparatus to acquire the captured image.

In step J3, the captured image is decoded. The point spread function previously generated in step J1 is used for the decoding. By the decoding, the depth estimate value of the object at each position is acquired.

In step J4, the environmental temperature of the imaging apparatus is specified. The environmental temperature is specified on the basis of, for example, the output signal of the temperature sensor or the like.

In step J5, the depth estimate value of the object at each position, that is each pixel, is corrected on the basis of the specified environmental temperature. The correction is made under use of previously-acquired correction data. The correction data is data indicating correspondence between an uncorrected depth estimate value and a corrected depth estimate value for each environmental temperature. The correction data can be acquired by experiments. That is, in step J5, a processing is performed, the processing converting and correcting the depth estimate value of the object at each position, that is each pixel, from the uncorrected value into the corrected value with reference to the data indicating the uncorrected and corrected depth estimate values at the specified environmental temperature.

In step J6, a processing is performed, the processing generating the depth map acquired by making correspondence between the blur-improved decoded image resulted from the decoding and the corrected depth estimate value.

Note that the environmental temperature may be specified any time in step J4 before the depth estimate value is corrected if the specification is based on the temperature information acquired nearly at the time of coded imaging.

In the method of correcting the depth estimate value in the comparative example, the captured image is decoded under use of the previously-defined point spread function, and the resultant depth estimate value is corrected for each pixel while depending on the environmental temperature. The distinction of the method is that the method takes a relatively long time for the correction and applies a large load onto the processor since the correction is necessary for each pixel.

To the contrary, the imaging system 1 according to the first embodiment specifies the point spread function on the basis of the specified environmental temperature of the imaging apparatus, and decodes the captured image under use of the point spread function to acquire the object depth estimate value.

Therefore, the imaging system 1 according to the first embodiment does not need to perform the correction for each pixel as different from the method of correcting the depth estimate value of the object at each position on the basis of the environmental temperature T of the imaging apparatus 2, and therefore, can remarkably reduce the amount of computing of the processor 301. Consequently, the load applied on the processor 301 can be reduced, and the time taken for acquiring the depth estimate value of the object at each position can be reduced.

Further, in the imaging system 1 according to the first embodiment, the point spread function is acquired and specified by the computing. Thus, the point spread function can be accurately acquired and specified to be not a discretely-changing solution but a continuously-changing solution for the specified environmental temperature, and the depth estimate value can be accurately acquired.

By such processings in the imaging system 1, the appropriate corrected depth estimate value dr of the object 90 can be more accurately acquired even if the environmental temperature T of the imaging apparatus 2 changes, the more practical DFD technique can be achieved.

Modification Example of First Embodiment

A modification example of the imaging system 1 according to the first embodiment will be described. The present modification example is different from the first embodiment in a function to specify the point spread function in the computing control processor. Specifically, the computing control processor acquires the point spread function used for the decoding by not performing the computing but using previously-stored data.

Figure 7:
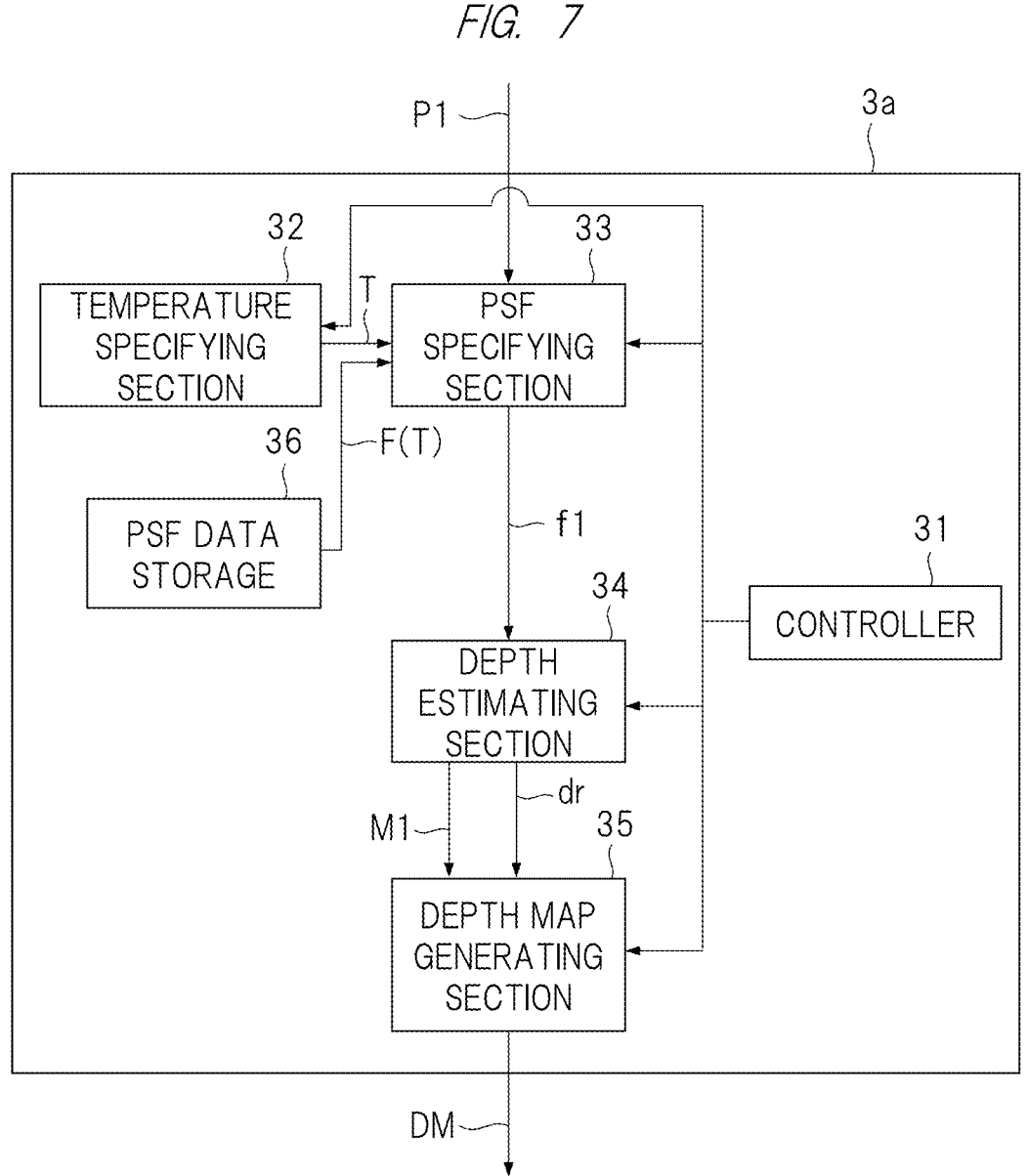
FIG. 7 is a functional block diagram of a computing control processor according to a modification example of the first embodiment.

FIG. 7 is a functional block diagram of a computing control processor 3*a* according to the modification example of the first embodiment. As illustrated in FIG. 7, a PSF data storage 36 is newly added to the computing control processor 3 according to the first embodiment thereby to achieve the computing control processor 3*a* according to the present modification example.

The PSF data storage 36 stores data indicative of correspondence between the environmental temperature and the point spread function (PSF) applied at the environmental temperature for each of a plurality of environmental temperatures of the imaging apparatus 2. The correspondence can be previously acquired by experiments or the like.

The PSF specifying section 33 specifies the point spread function F on the basis of the environmental temperature T by not performing the computing but using the data previously stored in the PSF data storage 36.

FIG. 8 is a diagram illustrating a table TB indicating the correspondence between the environmental temperature T and the point spread function F applied at the environmental temperature T. As illustrated in FIG. 8, for example, in the table TB, an environmental temperature T0 is corresponded to a point spread function F(T0) applied at the environmental temperature T0. An environmental temperature T1 is corresponded to a point spread function F(T1) applied at the environmental temperature T1. Similarly, the environmental temperatures T0, T1, T2, . . . , In . . . , TM are corresponded to with the point spread functions F(T0), F(T1), F(T2), F(Tn), . . . , F(TM), respectively. The environmental temperatures T0 to TM in the table TB are set in a range of, for example, −10° C. and +40° C., and the environmental temperatures T0, T1, . . . are set to have an interval of 0.1° C. therebetween.

The PSF specifying section 33 reads a point spread function corresponding to an environmental temperature that is the nearest to the specified environmental temperature T among the environmental temperatures T0 to TM from the PSF data storage 36, and specifies it as a point spread function used for the decoding. Note that the PSF specifying section 33 may perform an interpolation processing under use of two point spread functions corresponding to two environmental temperatures that are the nearest and second nearest to the specified environmental temperature T among the environmental temperatures T0 to TM to acquire the point spread function used for the decoding.

According to the present modification example, the point spread function used for the decoding is specified on the basis of the specified environmental temperature by not performing the computing but using the previously-stored data. Thus, the load applied on the processor 301 can be further reduced, and the time taken for specifying the point spread function can be also further reduced.

In the first embodiment, the point spread function is specified on the basis of the environmental temperature of the imaging apparatus. However, the point spread function may be acquired by performing simulation based on the acquired positional relationship between the optical system and the imaging apparatus.

Other Embodiment

The imaging system according to the first embodiment and its modification example have been described above. And, an object depth estimation method in the processing flow of the imaging system 1 is also one embodiment of the present invention. That is, according to one embodiment of the present invention, an object depth estimation method includes: a step of performing the coded imaging on the object under use of the imaging apparatus including the optical system and the imaging apparatus; a step of specifying the environmental temperature of the imaging apparatus; a step of specifying the point spread function used for decoding the captured image on the basis of the specified environmental temperature; and a step of estimating the depth of the object at each position from the optical system by decoding the captured image of the imaging apparatus under use of the specified point spread function.

A program for causing a computer to function as the temperature specifying section 32, the PSF specifying section 33, and the depth estimating section 34 and a non-transitory tangible computer-readable storage medium for non-transitorily storing the program therein are also embodiments of the present invention.

Various embodiments of the present invention have been described above. However, the present invention is not limited to the forgoing embodiments, and includes various modification examples. The above-described embodiments have been explained in detail for supporting understanding of the present invention, and are not always limited to the one including all structures explained above. Also, a part of the structure of one embodiment can be replaced with the structure of another embodiment, and besides, the structure of another embodiment can be added to the structure of one embodiment. All these manners belong to the cope of the present invention. Additionally, the numerical values and the like in the specification and the drawings are merely examples, and the use of different ones does not lose the effects of the present invention.

For example, the above embodiments are in the example in which the imaging system 1 is arranged on the automobile. However, the imaging system 1 may be arranged on a vehicle other than the automobile, such as railway train, monorail train, motorcycle, bicycle, and drone. Even in such arrangement examples, the imaging system 1 can achieve the similar effects to those of the above embodiments, and can be used for, for example, driving assistance techniques.

What is claimed is:

1. An imaging system comprising:
   an imaging apparatus including an optical system and an imaging apparatus and configured to perform coded imaging on an object under use of the optical system and the imaging apparatus;
   a temperature specifying section configured to specify an environmental temperature of the imaging apparatus;
   a function specifying section configured to specify a point spread function used for decoding a captured image on basis of the specified environmental temperature; and
   a depth estimating section configured to estimate a depth of the object at each position from the optical system by decoding the captured image of the imaging apparatus under use of the specified point spread function.

2. The imaging system according to claim 1,
   wherein the function specifying section acquires and specifies the point spread function used for the decoding by performing computing using the specified environmental temperature as a parameter.

3. The imaging system according to claim 1 comprising:
   a storage configured to store correspondence between the environmental temperature and the point spread function for each of a plurality of environmental temperatures of the imaging apparatus,
   wherein the function specifying section specifies the point spread function used for the decoding on basis of the specified environmental temperature and the stored correspondence.

4. The imaging system according to claim 1,
   wherein the imaging apparatus is arranged on a vehicle.

5. The imaging system according to claim 4,
   wherein the vehicle is an automobile.

6. An object depth estimation method comprising steps of:

performing coded imaging on an object under use of an imaging apparatus including an optical system and an imaging apparatus;

specifying an environmental temperature of the imaging apparatus;

specifying a point spread function used for decoding a captured image on basis of the specified environmental temperature; and estimating a depth of the object at each position from the optical system by decoding the captured image of the imaging apparatus under use of the specified point spread function.

7. The object depth estimation method according to claim 6, wherein the point spread function used for the decoding is acquired and specified by performing computing using the specified environmental temperature as a parameter.

8. The object depth estimation method according to claim 6, comprising a step of:

storing correspondence between the environmental temperature and the point spread function for each of a plurality of environmental temperatures of the imaging apparatus, wherein the point spread function used for the decoding is specified on basis of the specified environmental temperature and the stored correspondence.

9. The object depth estimation method according to claim 6, wherein the imaging apparatus is arranged on a vehicle.

10. The object depth estimation method according to claim 9, wherein the vehicle is an automobile.

* * * * *